United States Patent [19]
Robertson

[11] Patent Number: 5,388,140
[45] Date of Patent: Feb. 7, 1995

[54] FILM CASSETTE

[75] Inventor: Jeffrey C. Robertson, Rochester, N.Y.

[73] Assignee: Eastman Kodak Company, Rochester, N.Y.

[21] Appl. No.: 85,536

[22] Filed: Jun. 30, 1993

[51] Int. Cl.$^6$ ............................................. G03B 41/16
[52] U.S. Cl. ................................. 378/187; 378/182; 378/188
[58] Field of Search ............... 378/187, 188, 182, 184, 378/185, 167

[56] References Cited

U.S. PATENT DOCUMENTS

| | | | |
|---|---|---|---|
| 3,153,145 | 10/1964 | Yerkovich | 250/68 |
| 3,287,012 | 11/1966 | Woodcock | 271/18 |
| 3,383,507 | 5/1968 | Brackett et al. | 378/188 X |
| 3,703,272 | 11/1972 | Lareau | 250/67 |
| 4,032,790 | 6/1977 | Nakamura | 378/188 X |
| 4,081,686 | 3/1978 | Nieuweboer | 250/480 |
| 4,157,474 | 6/1979 | Koontz et al. | 250/480 |
| 4,194,625 | 3/1980 | Stievanart et al. | 206/455 |
| 4,251,731 | 2/1981 | Bauer | 250/468 |
| 4,259,586 | 3/1981 | Schmidt et al. | 250/481 |
| 4,303,327 | 12/1981 | LaBelle et al. | |
| 4,418,420 | 11/1983 | Bauer et al. | |
| 4,434,501 | 2/1984 | Pfeiffer et al. | |
| 4,538,294 | 8/1985 | Tamura et al. | 378/187 |
| 4,589,125 | 5/1986 | Schmidt et al. | |
| 4,637,043 | 1/1987 | Bauer | 378/188 |
| 4,688,243 | 8/1987 | DeFilice et al. | |
| 4,734,926 | 3/1988 | Singer et al. | |
| 4,763,346 | 8/1988 | Niedospial et al. | |
| 4,782,505 | 11/1988 | Ogo | 378/187 |
| 4,947,419 | 8/1990 | Schmidt et al. | |
| 5,265,148 | 11/1993 | Bauer et al. | 378/188 X |

FOREIGN PATENT DOCUMENTS

| | | | |
|---|---|---|---|
| 1119525 | 6/1956 | France | 378/187 |
| 2349128 | 4/1975 | Germany | 378/187 |
| 2838059 | 5/1983 | Germany | |
| 0055922 | 4/1983 | Japan | 378/187 |
| 0116737 | 7/1984 | Japan | 378/187 |

Primary Examiner—David P. Porta
Attorney, Agent, or Firm—William F. Noval

[57] ABSTRACT

A film cassette comprising a base and a cover adapted to close upon and cooperate with the base. A pressure plate is disposed between the cover and the base. The cover, base and pressure plate form a light-tight space for receiving a sheet of film. At least one biasing member is provided for biasing the pressure plate against the base when the cover is closed on the base. The pressure plate and base each having a configuration such that when the cassette is closed, a predetermined pressure distribution is applied to a sheet of film placed in the cassette. There is also provided a method of making a cassette which includes steps for defining a specific shape for the fabricated cassette such that the cassette will provide improved performance during use.

26 Claims, 10 Drawing Sheets

FILM CASSETTE

FIELD OF THE INVENTION

This is directed to a cassette for holding a sheet of film and, more particularly, a cassette designed to hold a sheet of x-ray film.

BACKGROUND OF THE INVENTION

In the field of radiography, it is common to enclose an unexposed x-ray film in a light-tight cassette, which allows the radiographic procedure to be conducted in normal room lighting. The cassette is normally made from materials such as plastics, aluminum, glass fiber composites, or carbon fiber composites, which are opaque to visible light, but relatively transparent to x-rays. Since x-ray films are not highly efficient at producing latent images from x-ray exposure, it is common to include image intensifying screens within the cassettes to increase imaging efficiency.

Typically, two intensifying screens are mounted on resilient foam pads, which are in turn, mounted on the opposing inner faces of the x-ray cassette. The x-ray film is placed between the opposing intensifying screens, which are urged into intimate contact with the film by the resilient foam pads. A latching mechanism and hinge allow the cassette to be opened so that exposed films can be removed for processing and unexposed films can be loaded into the cassette.

Whereas the use of intensifying screens significantly decreases the amount of x-ray energy required to create a usable image on the film, there is an inherent loss in image sharpness as compared to an image formed without the aid of intensifying screens.

An intensifying screen, typically made with rare earth phosphors, absorbs energy from the x-ray beam, and then re-emits the energy in the visible portion of the electromagnetic spectrum. The emitted visible wavelengths, principally blues, expose adjacent areas of the x-ray film.

Since these visible wavelength emissions are omni-directional, any separation between the emitting phosphor and the light-sensitive layers of the film result in the image of each discrete point on the screen being formed over a finite area on the film. In a practical sense, the image of the edge of an object being x-rayed should result in a stepwise increase in the density of the image on the processed film, however, because of the spread of imaging light from the intensifying screen at the imaged edge, the resulting density increase occurs over a finite distance, thus the image of the edge is not sharp.

In conventional radiography, both sides of the film are each coated with a light-sensitive layer and a clear, protective overcoat layer. Intensifying screens are coated with a rare-earth phosphor layer and clear protective overcoat layer. Some loss in image sharpness results from the spread of light emitted from the phosphor layer as it passes through the overcoat layers. Some of the light emitted by each intensifying screen passes through the light sensitive layers adjacent the screen, and through the film base, exposing the light-sensitive layer on the opposite side of the film. Since the opposite side light-sensitive layer is separated from the emitting phosphor layer by a significant distance, this secondary portion of the image is poorly resolved. For general radiography, the size of the object of interest obviates the need for maximum image sharpness, and the desire to minimize the patient exposure to x-rays dictates the use of the two-screen system.

In the specialized field of mammography several unique problems emerge. The size of the objects of interest, small calcifications and fibrils in breast tissue, dictate the use of a system with superior image detail forming capability. Differentiation of calcifications and fibrils within normal breast tissues requires the use of x-rays with low penetrating power (longer wavelengths) and further dictates a superior imaging system to prevent the loss of image contrast which would degrade such differentiation. The need to image the entire breast tissue mass requires that one edge of the film be capable of being located very close to the patients chest wall.

In conventional mammography it is common to utilize a light-tight cassette generally made from a plastics material and specifically designed to contain the film with at least one edge of the film adjacent to an exterior side wall of minimum thickness. Although some two-screen mammography systems are used, the more common practice is to utilize a film with light-sensitive layers coated only on one side, and a single screen urged into intimate contact with the light-sensitive side of the film. Typically, this intensifying screen is mounted on the surface of a resilient foam pad which is mounted to the cover of the cassette. The cover is attached to the cassette bottom by means of a hinge and provided with latching means to hold the cassette in the closed condition. The foam pad is sized in thickness such that it is partially compressed when the cassette is closed, thus urging the screen into contact with the film.

In conventional mammography cassettes, several problems arise which contribute to losses in image sharpness resulting from poor film/screen contact.

In the typical mammography cassette, the cassette bottom and the cassette cover are essentially flat planar surfaces, and the typical resilient foam pad is uniform in thickness. In use, the film is placed into the bottom of the cassette and the cover is rotated on its hinge to the closed position. The cover mounted intensifying screen essentially approaches the film at right angles to the film surface making contact with the film over essentially the entire film area often trapping pockets of air between the film and the intensifying screen, thus preventing intimate film/screen contact over some significant areas.

Screens are typically manufactured by coating a layer of rare-earth phosphor in a binder, onto a flexible plastic base, overcoating the phosphor layer for physical protection, and balancing the curl tendency of the above layers by coating curl control layers on the back side of the plastic base material. Small anomalies in the flatness of the surface result from thickness imperfections in the base material, coated layer thickness variations, and/or variability in the drying of the coated layers which induces local variability in the curl tendency of the layers.

In the typical mammography cassette manufactured from a plastics material generally by the injection molding process, imperfections in the mold surface, variability in the injection molding process temperatures and pressures, variability in the plastics material itself, and non-uniformity in the cooling of the part within the mold may result in local disturbances in the flatness of the cassette surface against which the film is loaded.

Also, in a typical mammography cassette, the flat design of the cassette cover and body limits the density of the foam pad and the amount of compression that can be tolerated. Typical internal pressures are approximately 0.1 psi or less, and evaluation of these cassettes has shown that this low level of pressure is insufficient to overcome local anomalies in the surface flatness of screens and cassettes, and local areas of poor contact exist, with the diameter of these areas typically 0.5 inches, and with the separation of the film and the screen typically 0.0005 inches at the center of the area. This degree of separation is sufficient to significantly degrade the sharpness of the image in the affected area.

Attempts to incorporate denser and/or thicker foam pads to increase the film/screen contact pressure have proven unsuccessful because the higher internal pressure produces an unacceptable degree of bulging of the cassette. Bulging of the cassette cover and body panels results in uneven contact pressure and may cause a large area of non-contact at the center of the cassette. Bulging of the cassette may also render it unusable in the cassette holders typically incorporated into mammography x-ray apparatus.

The present invention provides an improved mammography cassette which minimizes and/or eliminates the problems experienced in prior art cassettes. The improved cassette features a cassette body and a pressure plate which are designed to develop a uniform pressure over the entire area of film/screen contact at a substantially higher pressure than current cassettes. The screen is adhesively laminated to the smooth rigid surface of the pressure plate, thus correcting local screen surface anomalies resulting from non-uniform curl and drying. A resilient foam pad is interposed between the film and the cassette bottom effectively preventing any imperfections in the bottom surface from affecting the film/screen contact and urging the film into intimate contact with the intensifying screen. A cover carries one portion of the cassette latching means and is attached to the cassette bottom by a plastic living hinge. A window is provided for the optical imaging of patient identification onto the film enclosed in the cassette.

The proper shape for the pressure plate and cassette body are determined by a finite element modeling technique. Initially, the shapes are assumed to be flat parallel surfaces. When the appropriate loads are applied, constant pressure on the film/screen areas, and uniform loads along suspension spring surfaces, the load deformation can be determined from an appropriate finite element model. The predicted deformation represents the error from the desired flat parallel state. The original model is then corrected and the resulting model is again loaded and its deformation determined and again compared to the desired state. This iterative process is continued until the predicted error is within acceptable limits.

SUMMARY OF THE INVENTION

In one aspect of the present invention there is provided a film cassette comprising a base and a cover adapted to close upon and cooperate with the base. A pressure plate is disposed between the cover and the base. The cover, base and pressure plate form a light-tight space for receiving a sheet of film. At least one biasing member is provided for biasing the pressure plate against the base when the cover is closed on the base. The pressure plate and base each have a configuration such that when the cassette is closed, a predetermined pressure distribution is applied to a sheet of film placed in the cassette.

In an other aspect of the present invention there is provided a method of making a cassette which includes steps for defining a specific shape for the fabricated cassette such that the cassette will provide improved performance during use.

DETAILED DESCRIPTION OF THE DRAWINGS

DESCRIPTION OF A PREFERRED EMBODIMENT

Figure 1:
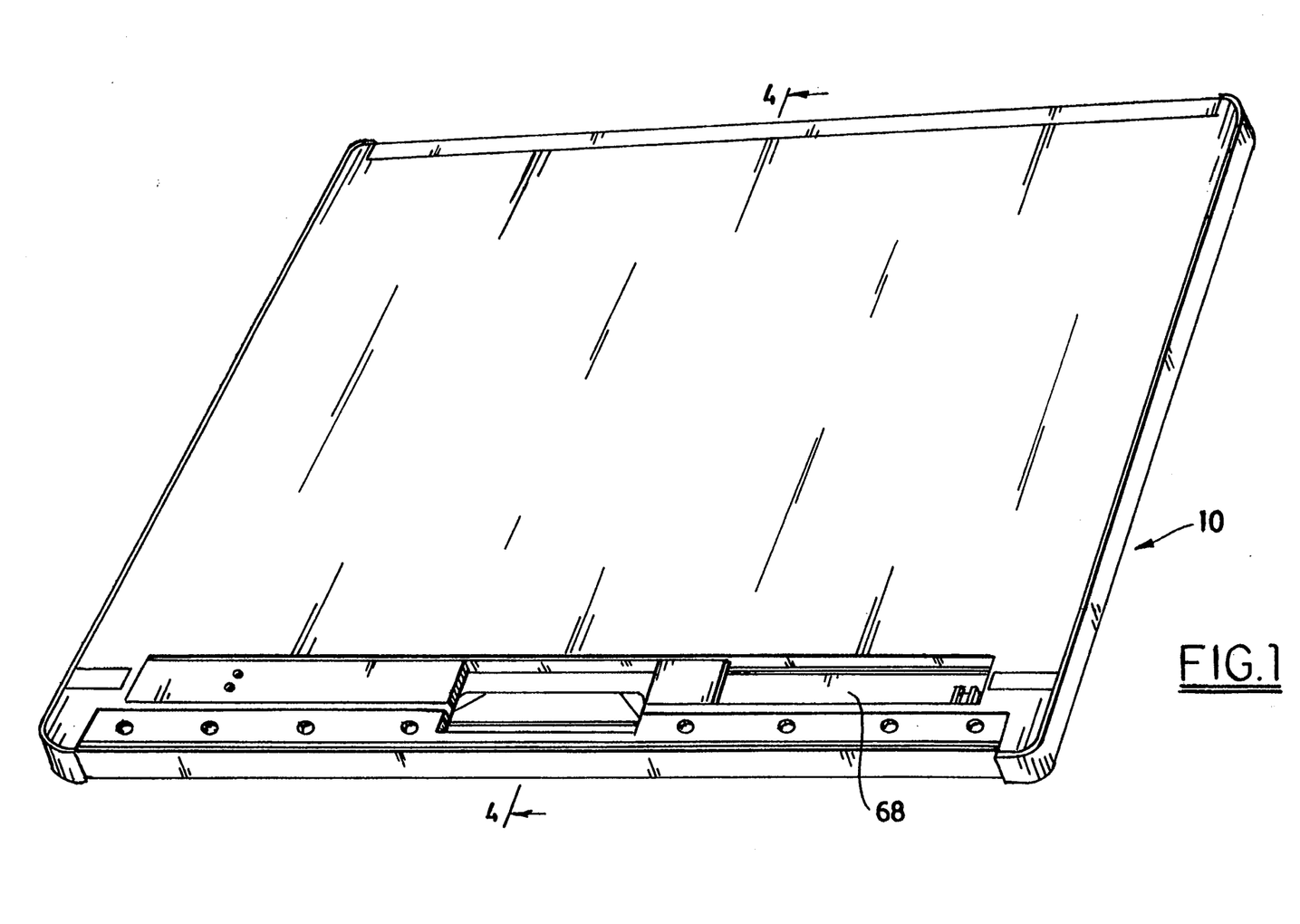
FIG. 1 is a perspective view of a cassette made in accordance with the present invention.
Figure 2:
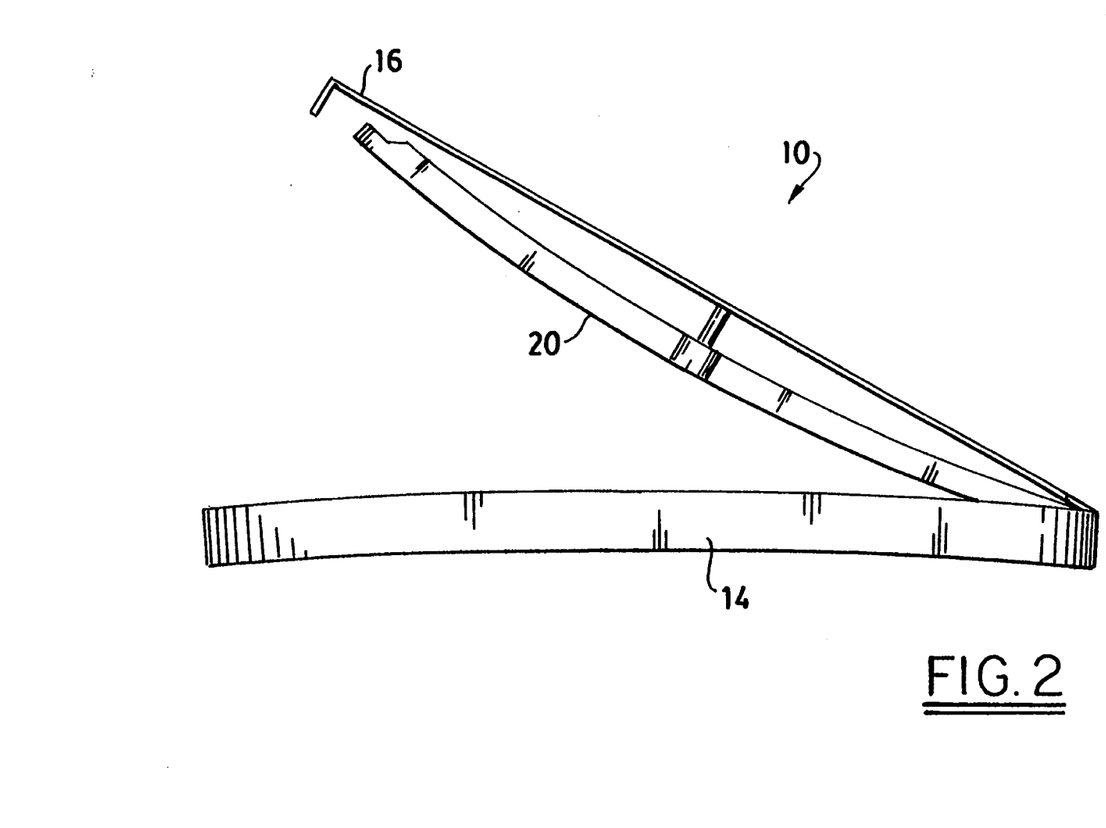
FIG. 2 is a side elevational view of the cassette of FIG. 1, illustrating the cassette in the open position.
Figure 3:
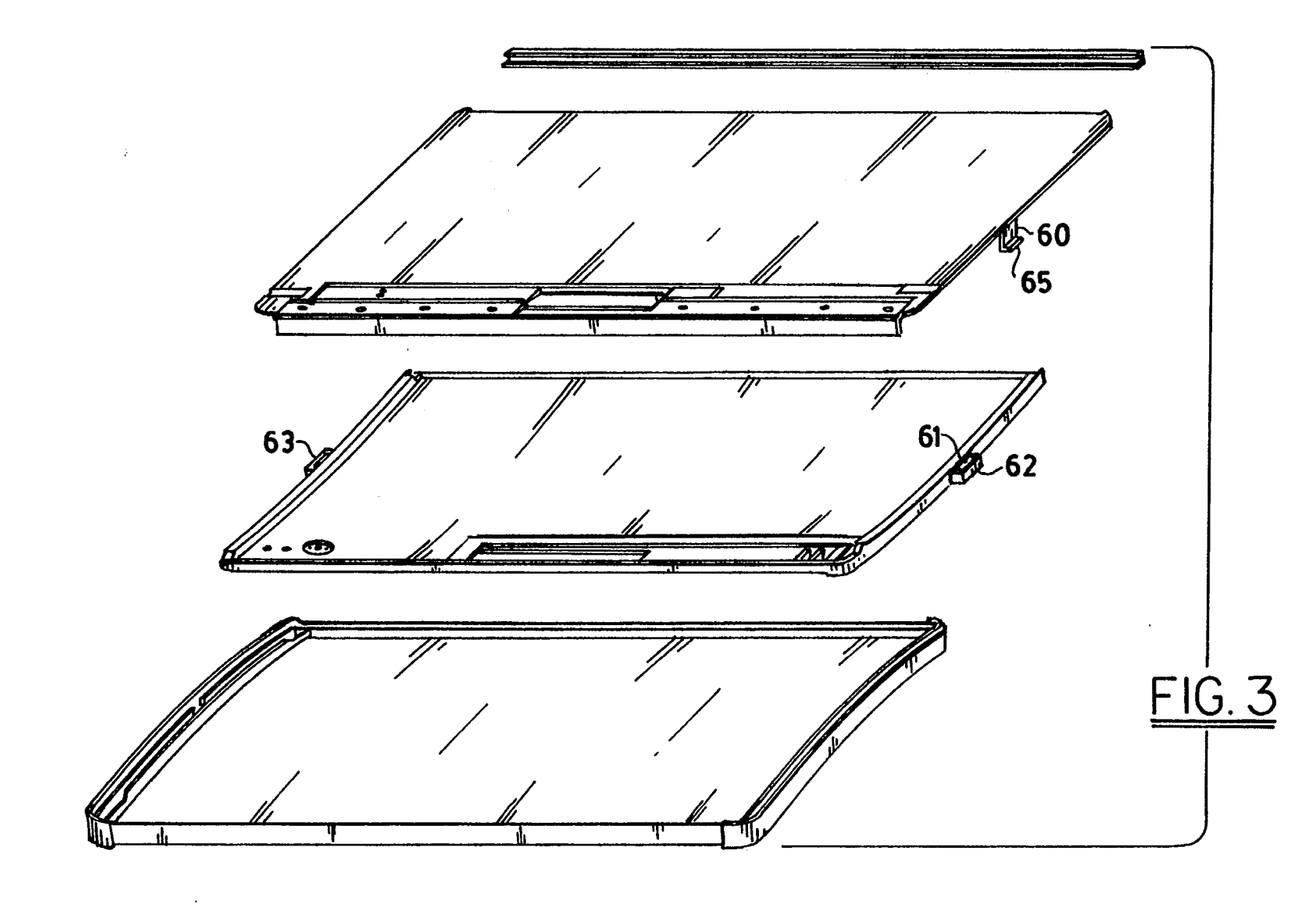
FIG. 3 is an exploded perspective view of the cassette of FIG. 1.

Referring to the drawings, there is illustrated a cassette 10 made in accordance with the present invention. In particular, referring to FIGS. 1-4, there is illustrated a cassette 10 which is adapted to receive a sheet of x-ray film 12. In the particular embodiment illustrated, the cassette 10 is designed to receive an x-ray film for use in mammography. Cassette 10 comprises a base 14 and a cover 16 secured to the base by a hinge 18 so that the cover 16 may be rotated between open and closed positions. A pressure plate assembly 20 is secured to the cover 16. The cover 16, pressure plate assembly 20 and base 14 form a light-tight space for receiving a sheet of x-ray film 12. A latch assembly 22 is provided for securing the cover 16 in closed relationship with base 16. In the particular embodiment illustrated, the latch assembly 22 includes a latch lever 24 which is rotatably mounted to cover 16 through the use of a pin 26 secured to cover 16 about which the lever 24 rotates. A retaining member 28 is secured to the base 14 and has a hook portion 30. A pawl member 32 is rotatably mounted to pin 26 and has a lower latch portion 34 for engagement with the hook portion 30 so as to maintain the cover in the closed position with the base 14. A projecting member 36 is secured to the outer rim 38 of the cover 16 for limiting the movement of the pawl member 32 toward the outer rim 38 of the cover. A spring 40 biases the pawl member 32 toward the outer rim 38 so as to maintain the latch portion 34 in engagement with the hook portion 30. When the lever 24 is rotated from the position illustrated in FIG. 4 outward, the lower end 41 will cause disengagement of the pawl member 32 so that the cover may be moved to the open position as illustrated in FIG. 2. In order to close the cover 16 onto the base 14, the cover 16 is simply moved toward the base 14 until the latch portion 34 engages the hook member 30. It is to be understood that various other latch mechanisms may be used for latching and unlatching the cover 16 with respect to base 14.

A foam pad 42 is secured to the base 14 as is typically done in prior art cassettes. The foam pad 42 is made out of a material typically used for such purposes. In the particular embodiment illustrated, foam pad 42 is made of polyether foam having a density of 1 lb/ft$^3$ and an ILD of 20, and is secured to base 14 by an appropriate adhesive. The pad 42 has a thin vinyl skin flame bonded to the side facing film 12.

The hinge 18 includes a first portion 44 which is secured to the cover 16 and a second portion 46 which is secured to the peripheral rear wall 48 of base 14. In the particular embodiment illustrated, the first portion 44 has a generally J-shaped configuration, forming a recess 50 for receiving a first mating projection 52 on cover 16. In a like manner, the second portion 46 comprises a generally C-shaped configuration forming a recess 54 which receives a second mating projection 56 on rear wall 48. A connecting portion 58 connects the first and second portions 44, 46. In the preferred embodiment illustrated, the hinge 18 is integrally formed of a single material so as to provide what is commonly known as a living hinge. In the particular embodiment illustrated, the hinge is made out of a polypropylene material. It is, however, to be understood that the hinge 18 may be formed in any other material and/or constructed in any desired manner.

Figure 4:
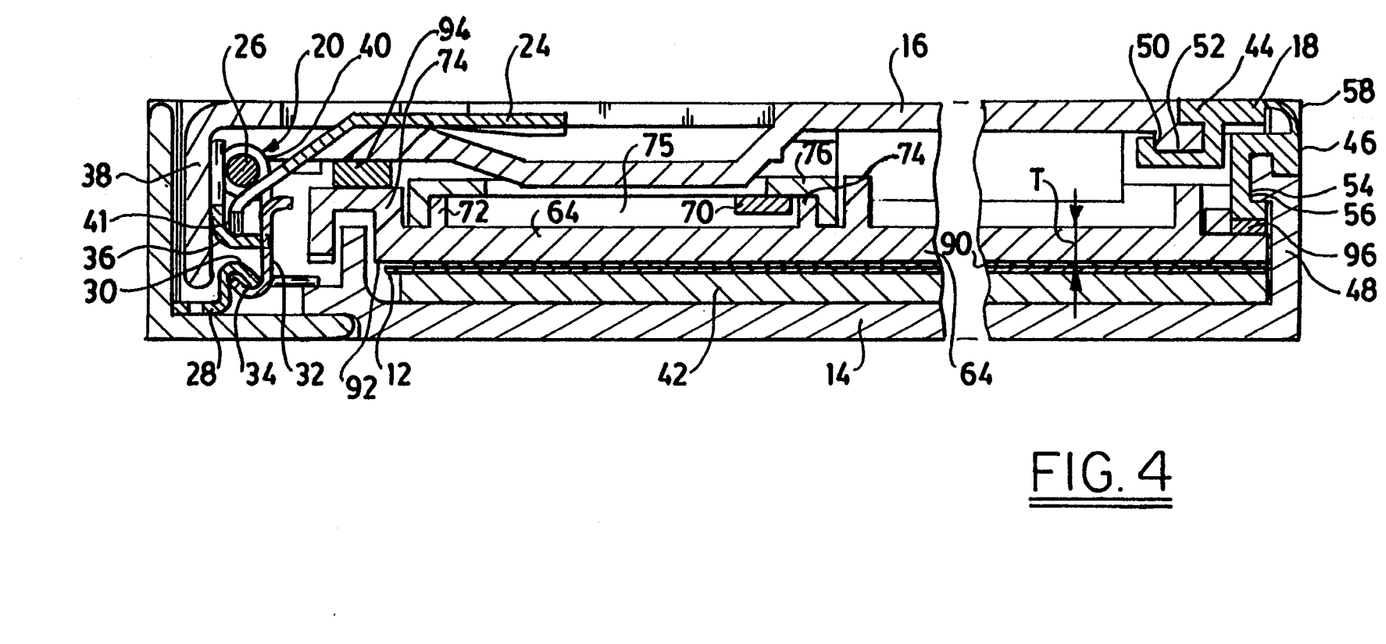
FIG. 4 is a cross-sectional view of the cassette of FIG. 1 as taken along line 4—4.
Figure 5:
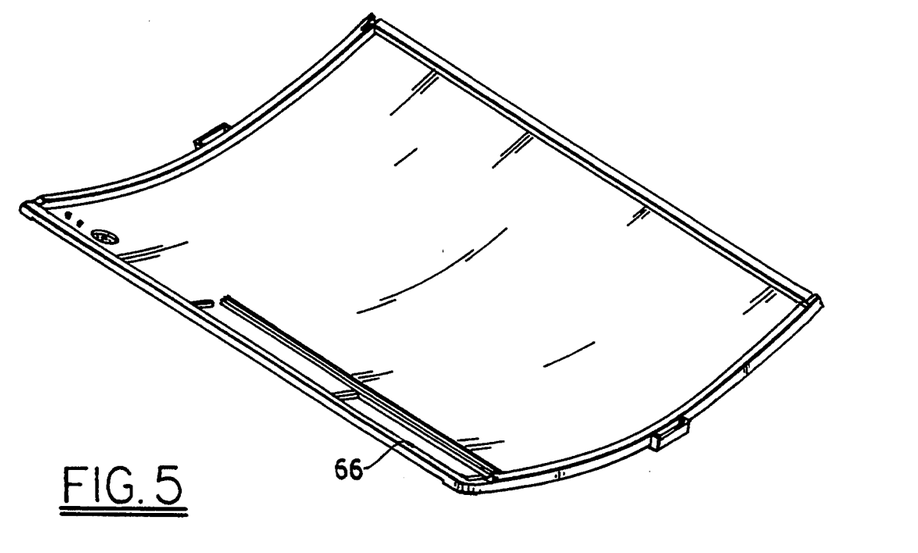
FIG. 5 is a perspective view of the pressure plate illustrated in FIG. 3.
Figure 6:
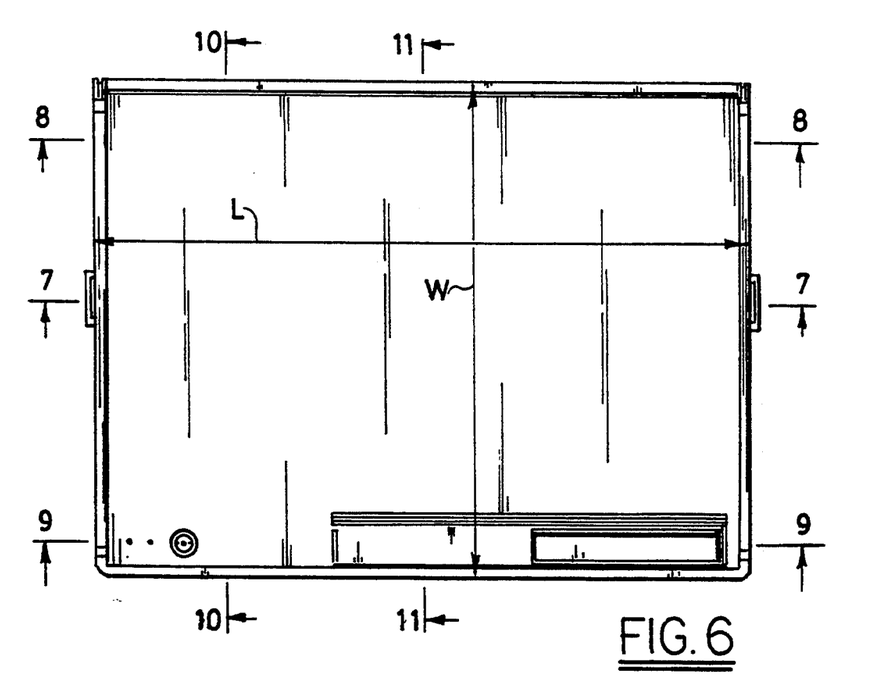
FIG. 6 is a top plan view of the pressure plate of FIG. 3.
Figure 7:
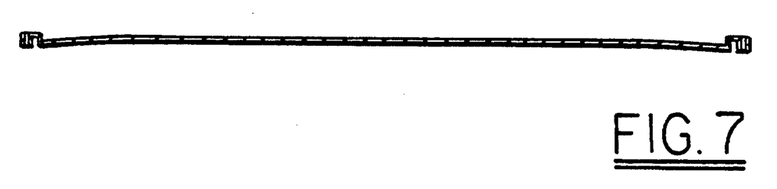
FIG. 7 is a cross-sectional view of the pressure plate of FIG. 6 as taken along line 7—7.
Figure 8:
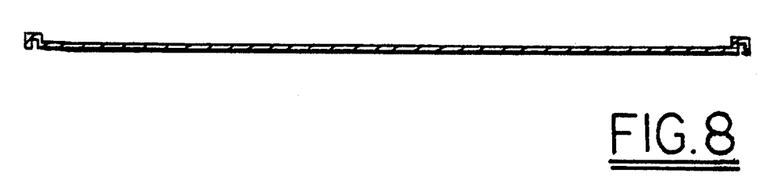
FIG. 8 is a cross-sectional view of the pressure plate of FIG. 6 as taken along line 8—8.
Figure 9:
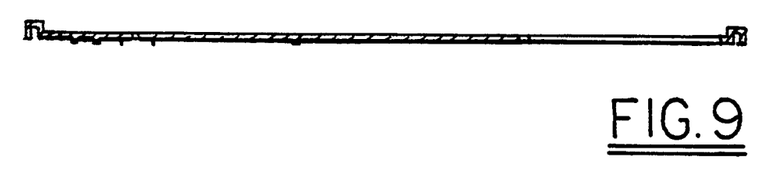
FIG. 9 is a cross-sectional view of the pressure plate of FIG. 6 as taken along line 9—9.
Figure 10:
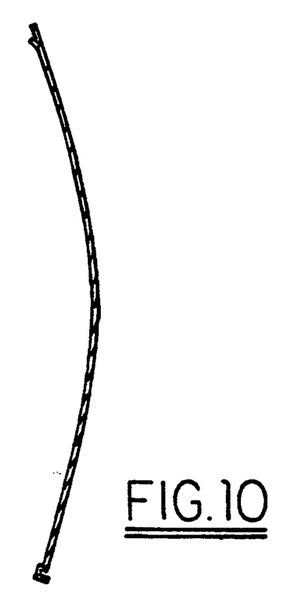
FIG. 10 is a cross-sectional view of the pressure plate of FIG. 8 as taken along line 10—10.
Figure 11:
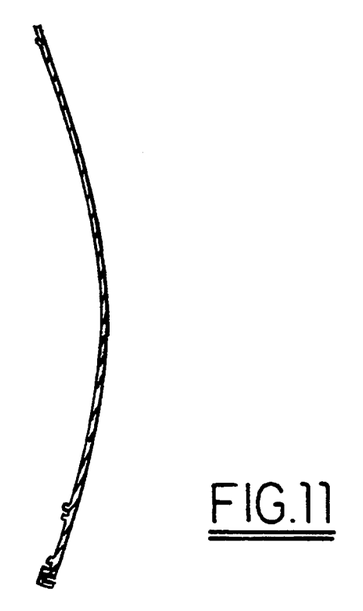
FIG. 11 is a cross-sectional view of the pressure plate of FIG. 8 as taken along line 11—11.

Referring to FIGS. 4–5, there is illustrated in more detail the construction of pressure plate assembly 20. In particular, pressure plate assembly 20 includes a pressure plate 64 having a substantially rectangular opening 66 which is in substantial alignment with a substantially rectangular identification opening 68 provided in cover 16. In the preferred embodiment illustrated, the openings 66, 68 each have substantially the same size and configuration. Openings 66, 68 allow information, for example, patient identification information, to be exposed on to the film as is customarily done in the art. A slideable shutter (not shown) is secured to pressure plate 64 for opening and closing the openings 66, 68. In the particular embodiment illustrated, upstanding projections 72, 74 are provided so as to provide a recess 75 for allowing the shutter 70 to slide within. In the particular embodiment illustrated, the upstanding projections 72, 74 have a substantially rectangular cross-sectional configuration and are spaced apart and sized so as to allow the shutter 70 to slide in a predetermined direction. A capture member 76 is provided and secured to projections 72, 74 such that the shutter 70 will be captured therein. Further details of the window and shutter assembly is set forth in copending application of Jeffrey C. Robertson entitled "Film Cassette" filed concurrently herewith, which is hereby incorporated by reference.

The pressure plate assembly 20 is secured to the cover by a pair of projections 60 which engage a pair of openings 61 provided in the lateral sides 62, 63 of pressure plate 64. The projections 60 are slightly deformed inward so as to allow it to pass through its associated opening 61. The projections 60 each have lip 65 at its lower end which prevents the pressure plate from disengaging from cover 16.

An optional film presence indicator may be provided as is also described in the copending application of Jeffrey C. Robertson, previously referred to above. The film presence indicator is rotatably held in position by a spring member which is secured to the pressure plate 64.

A stimulable phosphor screen/layer 90 is secured directly to the lower surface 92 of substantially rigid pressure plate 64. The screen 90 is of any conventional-type phosphor screen presently used in the art. In the particular embodiment illustrated, the screen 90 is adhered to the surface 92 by an appropriate adhesive as is also typically done in the prior art. By securing the screen 90 to the substantially rigid pressure plate, close contact is enhanced between the screen 90 and film 12, thus improving the image quality produced on the film 12.

A pair of spring members 94, 96 are provided between the cover 16 and pressure plate 64 such that when the cover is secured to the base 14 pressure will be applied against the pressure plate 64 thereby resulting in pressure being applied between the pressure plate 64 and foam pad 42. In the particular embodiment illustrated, spring members 94, 96 extend along the entire length of the lateral edges of the pressure plate. In the embodiment illustrated, spring members 94, 96 each comprise a strip of material made of resilient foam. The strips of foam are sized and made of material so as to provide the desired pressure. In the embodiment illustrated, the strips of foam are made of polyolefin having a density of 4 lb/ft$^3$ and an ILD of about 40. It is, of course, understood the spring members 94, 96 may take many other forms, for example, C-shaped springs, coil springs, leaf springs made of plastic or metal. The pressure plate 64 and base 14 are designed such that substantially uniform pressure is applied across the entire area of contact against the film. Preferably, the pressure does not vary by more than 0.1 psi. This is accomplished by molding the pressure plate 64 and base 14 in a shape such that when the appropriate load is applied at the locations identified by spring members 94, 96, a substantially uniform pressure will be applied across the film placed in the cassette. The configuration of the pressure plate 64, cover 16, base 14 and spring members 94, 96 are such that a pressure against the film is about 0.35 psi. This is in contrast to pressures of about 0.1 psi for conventional prior art mammography. The pressure plate 64 and base 14 are preferably made of a molded plastic material. In the particular embodiment illustrated, pressure plate 64 and base 14 are made of polycarbonate material. In particular, the pressure plate and base are preferably single unitary pieces which are injection molded of a suitable plastic material, each having a substantially uniform thickness in the area where the image of interest is to be developed.

Figure 12A:
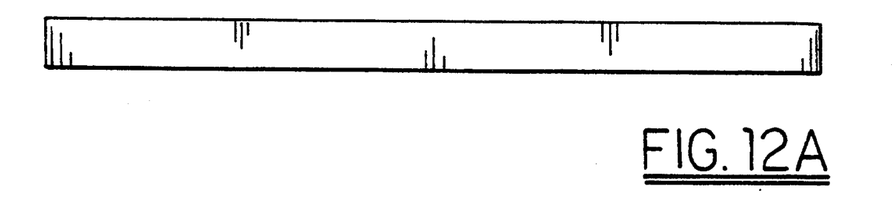
FIG. 12A is a side elevational view of a pressure plate of the desired shape when in the loaded condition.
Figure 12B:
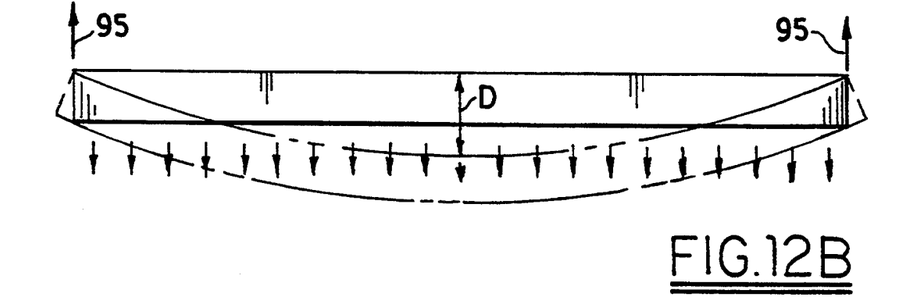
FIG. 12B is a side elevational view of the pressure plate of 12A when a normal loading force is applied in a direction opposite to that experienced by the pressure plate during normal use.
Figure 12C:
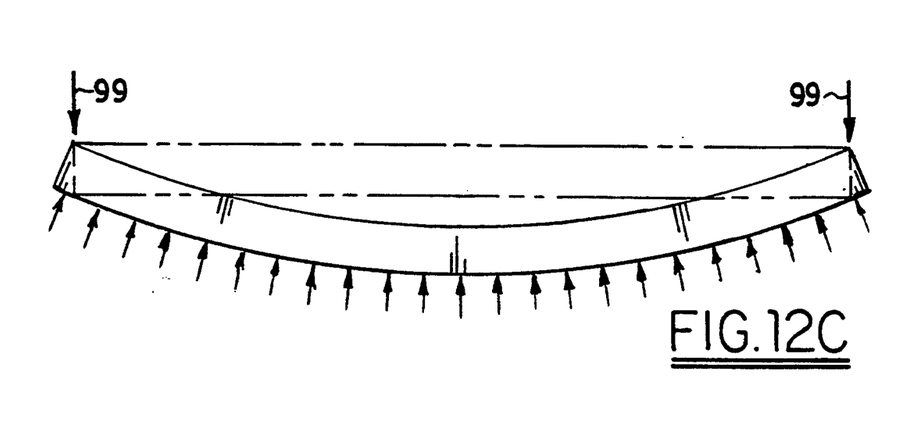
FIG. 12C is a side elevational view of the pressure plate of FIG. 12B formed in the configuration shown in solid lines subjected to a normal loading force.
Figure 13:
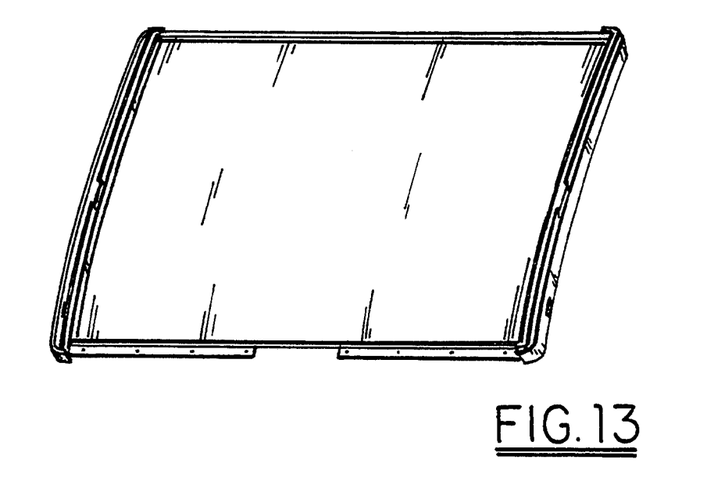
FIG. 13 is a perspective view of the base of FIG. 3.
Figure 14:
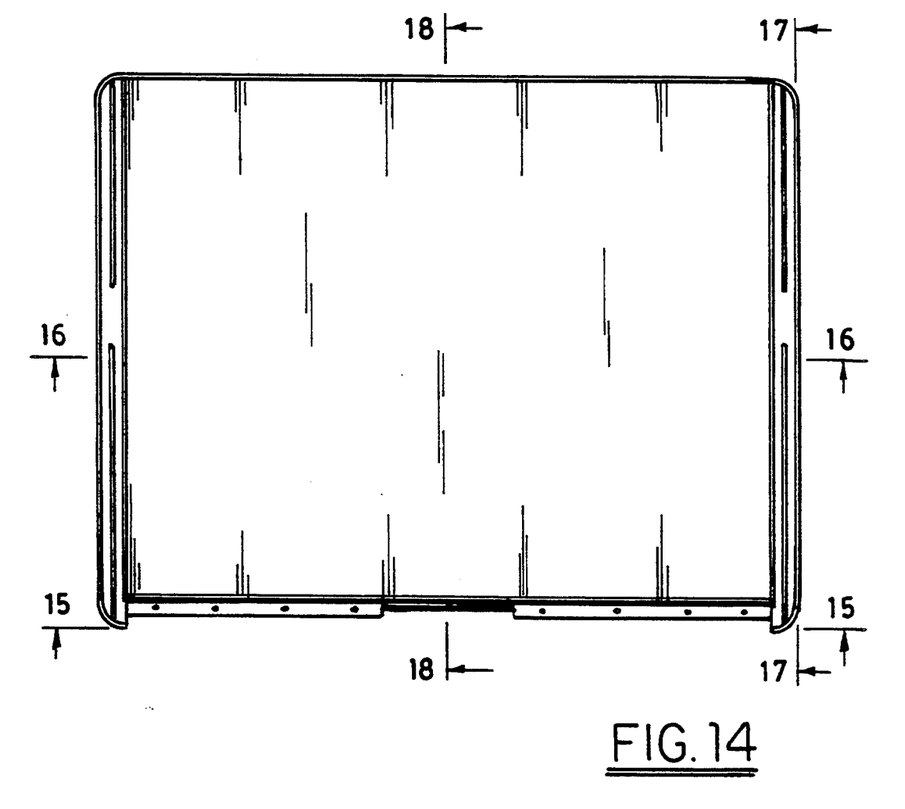
FIG. 14 is a top plan view of the base of FIG. 12.
Figure 15:
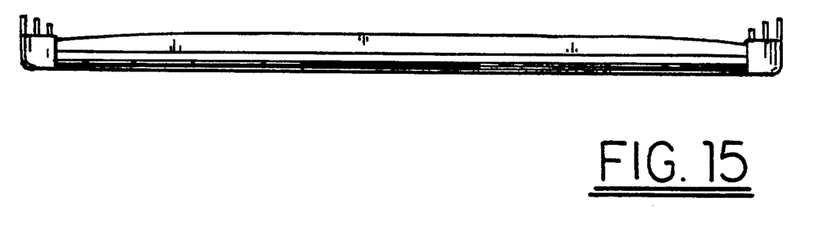
FIG. 15 is a front elevational view of the base as taken along line 15—15 of FIG. 14.
Figure 16:
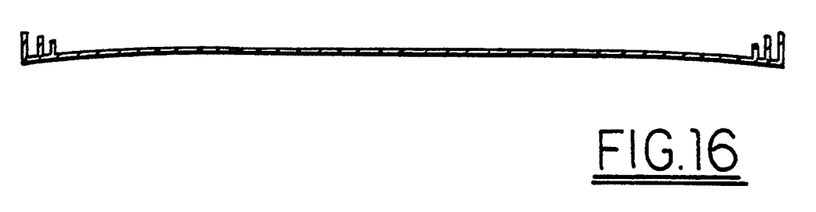
FIG. 16 is a cross-sectional view of the base of FIG. 14 as taken along line 16—16.
Figure 17:
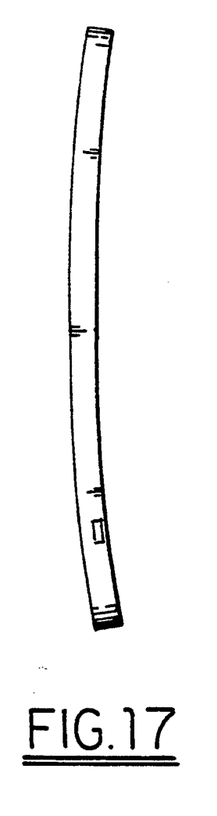
FIG. 17 is a side elevational view of the base as taken along line 17—17.
Figure 18:
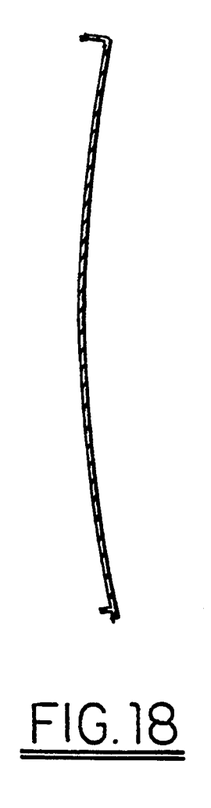
FIG. 18 is cross-sectional view of the base of FIG. 14 as taken along line 18—18.

Referring to FIGS. 5–11, there is illustrated the cross-sectional shape of the pressure plate 64 in the "as molded" configuration. That is, in the configuration in which no pressure is being applied between the pressure plate 64 and base 14. As can be seen, the pressure plate 64 is curved in both the X and Y directions. The particular shape in which the pressure plate is formed is dependent upon the material from which the pressure plate is made, and its particular configuration, that is, the length L, width W and thickness T of the pressure plate 64. In the embodiment illustrated, the base 14, cover 16 and pressure place each have a substantially uniform thickness of about 2 mm (0.08 inches). The particular shape of the pressure plate 64 is determined by mathematical modeling. In particular, the amount of deflection that would occur to the pressure plate 64 is of a predetermined configuration when a predetermined load/force is determined utilizing finite element analysis modeling technique. In particular, since a uniform pressure is desired across the pressure plate, the first predetermined desired configuration would be a pressure plate having a substantially flat contact surface when the pressure plate is under load as shown in FIG. 12A. Initially, a loading force would be applied to a mathematical model of the substantially flat pressure plate in a direction which is opposite to the direction in which the loading force is normally applied to the pressure plate during normal operation. Referring to FIG. 12B, arrows 95 indicate the direction in which a loading force would be applied which is opposite to the direction in which force would normally be applied. This force results in a new modified configuration as illustrated by phantom lines in FIG. 11B. The amount of deflection (D) across the pressure plate is determined and is added to the initial flat configuration (as shown in FIG. 12B) to define a new configuration (as shown by solid lines in FIG. 12C). Using this new modified configuration, a load is applied, using finite element analysis modeling techniques, in a direction normally applied to the pressure plate as indicated by arrows 99 (see FIG. 12C). This loaded shape (as shown by phantom lines in FIG. 12C) is then compared with the initial predetermined shape, as shown in FIG. 12A, which in the particular embodiment illustrated, was substantially flat. If the difference between the deflected configuration of the new modified configuration under design load and the desired shape is within tolerance limits, then the pressure plate is made in accordance with the new modified configuration as shown by solid lines in FIG. 12C. However, if the difference between this new modified configuration is loaded, as illustrated in FIG. 12C by phantom lines, and the desired shape as shown in FIG. 12A is greater than allowed tolerances, then the new modified configuration is redefined by the difference between these configurations. Accordingly, the difference between the desired shape of the cassette and the deflected new modified shape is calculated. This difference is added or subtracted as appropriate to the modified configuration to come up with a second modified configuration. This second new modified configuration is thus subjected to a predetermined loading force using finite element analysis modeling techniques as with the previous modified configuration experienced during normal use and the difference between this deflected second modified shape and desired shape is determined. If there continues to be a difference outside the allowed tolerances, this process is repeated until the tolerances are within the desired limits. Thus, the modified configuration developed will provide the shape of the pressure plate in the molded configuration. In the particular embodiment illustrated, the desired molded configuration is substantially convex in both the length and width directions.

Finite element analysis techniques are preferably used in determining the shape of the modified configuration when a load is applied. This technique is well known to those skilled in the art and will not be discussed further herein.

Figure 19A:
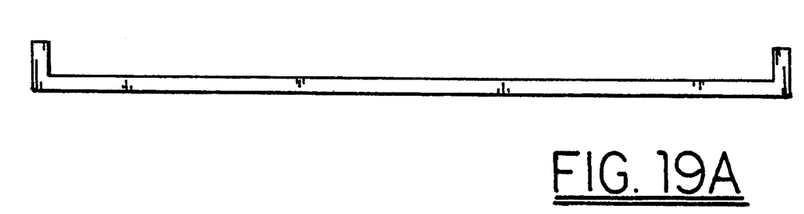
FIG. 19A is a side elevational view of a base of a desired shaped when in the loaded condition.
Figure 19B:
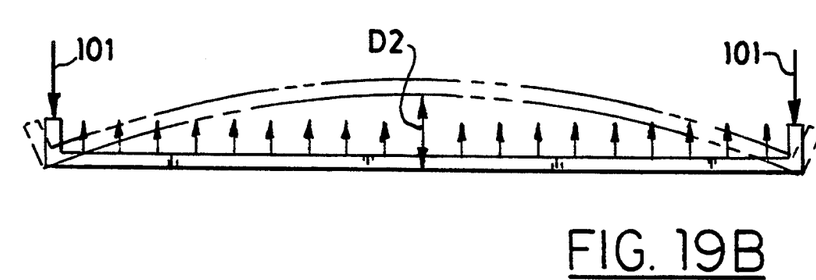
FIG. 19B is a side elevational view of the base of FIG. 19A when a normal loading is applied in a direction opposite to that experienced by the pressure plate during normal use.

Referring to FIGS. 13–18, there is illustrated base 14 in the "as molded" configuration. The same procedure used in designing the pressure plate 64 is also applied in designing the base. Thus, a initial predetermined shape is set forth for the base. This would be a shape substantially parallel to the desired shape for the mating pressure plate 64. In the particular embodiment illustrated, this would be substantially flat as illustrated in FIG. 19A. Here again a predetermined loading force is applied to the base in a direction opposite to the direction in which a loading force is normally applied to the base during normal operation of the cassette as illustrated by arrows 101 in FIG. 19B. This deflected configuration is compared with the initial predetermined shape and the difference is calculated. The amount of deflection D2 is added to the initial predetermined shape of FIG. 19A so as to define a new modified configuration for the base as shown by solid lines in FIG. 19C.

Figure 19C:
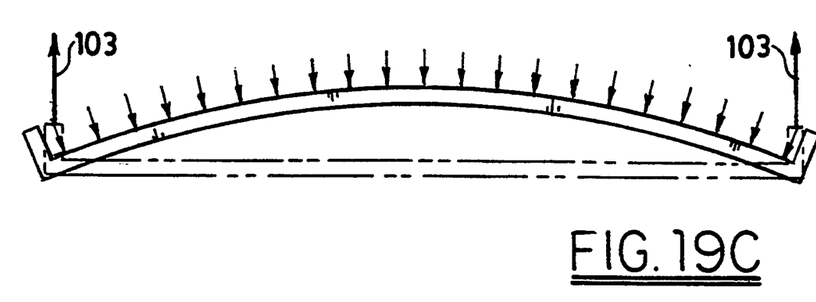
FIG. 19C is a side elevational view of the base of FIG. 19B formed in the configuration shown in solid lines subjected to a normal loading force.

This new modified shape is mathematically subjected to a loading force, for example, using finite element analysis techniques, in a direction normally applied to the base during normal operation of a cassette in the closed position as shown in FIG. 19C as indicated by arrows 103. The difference between the new modified configuration and the original desired configuration of FIG. 19A is determined, and if this difference is within prescribed tolerances, the base plate configuration in the unloaded condition has been defined by this new modified configuration. However, if the deflected new modified configuration is greater than allowed tolerances, the process is repeated. The design is further modified by the amount of difference in modified configuration and the desired shape, and again, recalculated and a loading force is applied to this new configuration until the tolerances are within prescribed limits. In the particular embodiment illustrated, the base is generally convex in both the length and width directions.

In the preferred method described, an initial loading force is applied to a mathematical model in a direction opposite to the direction which is experienced during normal use of the cassette. This is preferred as this results in the final design being rapidly determined. However, an initial loading force can be applied to the initial predetermined shape in a direction normally encountered by the base or pressure plate. The amount of deflection is then subtracted from the initial predetermined shape to define a new modified shape. Then this new modified shape is subjected to normal loading forces and this is compared with the desired initial predetermined shape. If it is within tolerances, this new modified shape will define the molded fabricated shape of the pressure plate or base. If the new modified shape is not within desired tolerances, the difference is added or subtracted to the new modified shape to define a second modified shape. This procedure is repeated until the modified shape is within tolerances. An initial prototype cassette, made in accordance with the present invention, was constructed and compared with a typical prior art cassette. In particular, contact tests were conducted in accordance to guidelines specified in the *American College of Radiology Mammography Quality Control Manual*. Test results show very significant reduction in the number of spots developed and substantially no indication of trapped air.

Thus, when all the mathematical modeling has been completed, the configuration for both the pressure plate 64 and base 14 will have been determined. Therefore, when the cassette is in the closed configuration, a substantially uniform pressure will be applied between pressure plate 64 and base 16.

The present invention provides an improved mammography cassette and method of designing cassettes which minimizes and/or eliminates the problems experienced in prior art cassettes. The cassette features a pressure plate which is designed to develop a uniform pressure over the entire area of film/screen contact at a substantially higher pressure than current cassettes. The screen is adhesively laminated to the smooth rigid surface of the pressure plate, thus correcting local screen surface anomalies resulting from non-uniform curl and drying. A resilient foam pad is interposed between the film and the cassette bottom effectively preventing any imperfections in the bottom surface from affecting the film/screen contact and urging the film into intimate contact with the intensifying screen.

It is to be understood that various changes and modifications may be made without departing from the scope of the present invention. For example, in the preferred embodiment, the initial desired configuration for both the pressure plate 64 and base 14 is substantially flat, however, other mating configurations may be selected if so desired. Additionally, other mathematical techniques other than finite element analysis may be used in designing the cassette.

What is claimed is:

1. A film cassette comprising:
   a base which is substantially convex in both the length and width directions;
   a cover adapted to close upon and cooperate with said base;
   a pressure plate which is substantially convex in both the length and width directions disposed between said cover and said base, said cover, base and pressure plate forming a light-tight space for receiving film; and
   a biasing member for biasing said pressure plate against said base when said cover is closed on said base, said pressure plate and said base each having a configuration such that when said cassette is closed, a predetermined pressure distribution is applied to a sheet of film placed within the cassette.

2. A cassette according to claim 1 wherein said predetermined pressure distribution applied to the sheet of film is substantially uniform.

3. A cassette according to claim 1 wherein said pressure plate and said base are made of a plastic material.

4. A cassette according to claim 1 wherein said pressure plate comprises a substantially rectangular plate wherein said biasing means are applied along two opposed side edges of said pressure plate.

5. A cassette according to claim 4 wherein said biasing means comprises a layer of compression foam disposed between said cover and said pressure plate and along two side edges.

6. A cassette according to claim 5 wherein said layer of compressive foam comprises a pair of spaced strips.

7. A cassette according to claim 4 wherein said biasing means comprises a pair of springs, each spring having a substantially C-shaped cross-sectional configuration.

8. A cassette according to claim 1 wherein the pressure between said pressure plate and base does not vary by more than about 0.10 pounds per square inch along the surface of said pressure plate.

9. A cassette according to claim 1 wherein the pressure between the pressure plate and the base is in the range of 0.20 psi to 0.40 psi.

10. A cassette according to claim 1 wherein the pressure between the pressure plate and the base is in the range of 0.35 psi.

11. A cassette according to claim 1 wherein said pressure plate has a substantially constant cross-sectional thickness, said pressure plate being made of thermoplastic polycarbonate injection molding grade material and having a thickness of about 2 mm (0.080 inches).

12. An apparatus according to claim 1 wherein said cassette receives x-ray film.

13. A method of manufacturing a film cassette comprising a base, a cover adaptive for closure upon said base, a pressure plate disposed between said cover and said base and forming a space between said base and pressure plate for receiving an sheet of film, and a biasing member for biasing said pressure plate toward said base when said cover is closed upon said base, comprising the steps of:
   making a pressure plate of said cassette by:
   (a) mathematically determining the amount of deflection that would occur to said pressure plate of a predetermined desired configuration when a predetermined loading force is applied to said pressure plate;
   (b) defining a new modified configuration of said pressure plate in accordance to the amount of deflection calculated in said previous step;
   (c) mathematically determining the amount of deflection that would occur to said pressure plate of said modified configuration when a predetermined loading force is applied to said pressure plate in a direction normally applied to said pressure plate during normal operation of the pressure plate and determining the difference between said modified configuration in the deflected condition and said desired predetermined configuration;
   (d) making said pressure plate in accordance with said modified configuration if said difference is within predetermined tolerances;
   but, if said difference is greater than said predetermined tolerances, then, (e) defining another modified shape in accordance with said difference;

(f) repeating steps c, d and e until said difference is within allowed tolerances so as to make said pressure plate;

and, as a result of said mathematically determined pressure plate, making a base by:

(g) mathematically determining the amount of deflection that would occur to said base of a predetermined desired configuration when a predetermined loading force is applied to said base;

(h) defining a new modified configuration of said base in accordance to the amount of deflection calculated in said previous step;

(i) mathematically determining the amount of deflection that would occur to said base of said modified configuration when a predetermined loading force is applied to said base in a direction normally applied to said base during normal operation of the base and determining the difference between said modified configuration in the deflected condition and said desired predetermined configuration;

(j) making a base in accordance with said modified configuration if said difference is within predetermined tolerances;

but, if said difference is greater than said predetermined tolerances, then (k) defining another modified shape in accordance with said difference;

(l) repeating steps i, j and k until said difference is within allowed tolerances, so as to make said base;

wherein said pressure plate and said base are respectively substantially convex in both the length and width directions.

14. The method according to claim 13 wherein step (a) comprises said loading force being applied in a direction opposite to the direction in which a loading force is normally applied to said pressure plate during operation of the pressure plate.

15. The method according to claim 13 wherein step (g) comprises said loading force being applied in a direction opposite to the direction in which a loading force is normally applied to said base during operation of the base.

16. The method according to claim 13 wherein finite element analysis is used in mathematically determining the shape of said pressure plate or base.

17. An x-ray film cassette comprising:

a base which is substantially convex in both the length and width directions;

a cover adapted to close upon and cooperate with said base;

a pressure plate which is substantially convex in the length and width directions disposed between said cover and said base, said cover, base and pressure plate forming a light-tight space for receiving a sheet of film;

an intensifying screen secured directly to said pressure plate; and at least one biasing member for biasing said pressure plate against said base when said cover is closed on said base, said pressure plate and said base each having a configuration such that when said cassette is closed, a predetermined pressure distribution is applied to a sheet of film placed in the cassette.

18. A cassette according to claim 17 wherein said predetermined pressure distribution applied to the sheet of film is substantially uniform.

19. A cassette according to claim 17 wherein said pressure plate and said base are made of a plastic material.

20. A cassette according to claim 17 wherein said pressure plate comprises a substantially rectangular plate wherein said biasing means are applied along two opposed side edges of said pressure plate.

21. A cassette according to claim 20 wherein said biasing means comprises a layer of compression foam disposed between said cover and said pressure plate, and along two side edges.

22. A cassette according to claim 21 wherein said layer of compressive foam comprises a pair of spaced strips.

23. A cassette according to claim 20 wherein said biasing means comprises a pair of springs, each spring having a substantially C-shaped cross-sectional configuration.

24. A cassette according to claim 17 wherein the pressure between said pressure plate and base does not vary by more than about 0.10 pounds per square inch along the surface of said pressure plate.

25. A cassette according to claim 17 wherein the pressure between the pressure plate and the base is in the range of 0.20 psi to 0.40 psi.

26. A cassette according to claim 17 wherein the pressure between the pressure plate and the base is in the range of 0.35 psi.

* * * * *